United States Patent
Watanabe

(10) Patent No.: US 11,366,509 B2
(45) Date of Patent: Jun. 21, 2022

(54) METHOD FOR CONTROLLING DUAL-INPUT DISPLAY DEVICE WITH POWER-SAVING MODE, AND DISPLAY DEVICE

(71) Applicant: SEIKO EPSON CORPORATION, Tokyo (JP)

(72) Inventor: Ken Watanabe, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 17/130,130

(22) Filed: Dec. 22, 2020

(65) Prior Publication Data

US 2021/0191498 A1    Jun. 24, 2021

(30) Foreign Application Priority Data

Dec. 23, 2019 (JP) .............................. JP2019-231184

(51) Int. Cl.
| | |
|---|---|
| *G06F 1/3234* | (2019.01) |
| *G09G 3/20* | (2006.01) |
| *H04N 9/31* | (2006.01) |
| *G06F 1/3231* | (2019.01) |

(52) U.S. Cl.
CPC .......... *G06F 1/3265* (2013.01); *G06F 1/3231* (2013.01); *G09G 3/20* (2013.01); *G09G 2330/022* (2013.01); *G09G 2354/00* (2013.01); *H04N 9/312* (2013.01)

(58) Field of Classification Search
CPC ..................... G06F 1/3265; G09G 2330/022
See application file for complete search history.

(56) References Cited

U.S. PATENT DOCUMENTS

| | | | |
|---|---|---|---|
| 2014/0237079 A1* | 8/2014 | Lockerbie | H04N 21/2146 709/218 |
| 2016/0109934 A1* | 4/2016 | Woo | G06F 1/3265 345/211 |
| 2018/0173397 A1* | 6/2018 | Mathias | G06F 3/017 |

FOREIGN PATENT DOCUMENTS

| | | |
|---|---|---|
| JP | H10-149143 A | 6/1998 |
| JP | 2011-180331 A | 9/2011 |
| JP | 2012-141486 A | 7/2012 |

* cited by examiner

*Primary Examiner* — Laurence J Lee
(74) *Attorney, Agent, or Firm* — Oliff PLC

(57) ABSTRACT

A method for controlling a display device having a first interface to which a first image signal is inputted and a second interface to which a second image signal is inputted from an image supply device having an auto sleep function is provided. The method includes: shifting to a sleep mode in response to a continuous stop of the first image signal for a first time, in a first mode in which a first image based on the first image signal is displayed on a screen; and shifting to the sleep mode in response to a continuous stop of the second image signal for a second time that is shorter than the first time, in a second mode in which a second image based on the second image signal is displayed on the screen.

8 Claims, 5 Drawing Sheets

METHOD FOR CONTROLLING DUAL-INPUT DISPLAY DEVICE WITH POWER-SAVING MODE, AND DISPLAY DEVICE

The present application is based on, and claims priority from JP Application Serial Number 2019-231184, filed Dec. 23, 2019, the disclosure of which is hereby incorporated by reference herein in its entirety.

BACKGROUND

1. Technical Field

The present disclosure relates to a method for controlling a display device, and a display device.

2. Related Art

JP-A-2012-141486 discloses a projector that shifts to a sleep mode in which a light source is turned off, when an input of an image signal has not been detected for a predetermined time.

A so-called auto sleep function in which a device shifts to a sleep mode of low power consumption when a no-operation state has continued for a predetermined waiting time is known. When acquiring an image signal from an image supply device having the auto sleep function, the projector described in JP-A-2012-141486 consistently needs a time that is the sum of a waiting time of the image supply device and a waiting time of the display device until automatically shifting to the sleep mode. Therefore, the power consumed until the projector shifts to the sleep mode may increase.

SUMMARY

An aspect of the present disclosure is directed to a method for controlling a display device having a first interface to which a first image signal is inputted and a second interface to which a second image signal is inputted from an image supply device having an auto sleep function. The method includes: shifting to a sleep mode in response to a continuous stop of the first image signal for a first time, in a first mode in which a first image based on the first image signal is displayed on a screen; and shifting to the sleep mode in response to a continuous stop of the second image signal for a second time that is shorter than the first time, in a second mode in which a second image based on the second image signal is displayed on the screen.

Another aspect of the present disclosure is directed to a display device including: a first interface to which a first image signal is inputted; a second interface to which a second image signal is inputted from an image supply device having an auto sleep function; a display unit displaying an image on a screen; and a control circuit shifting to a sleep mode in response to a continuous stop of the first image signal for a first time, in a first mode in which a first image based on the first image signal is displayed on the screen, and shifting to the sleep mode in response to a continuous stop of the second image signal for a second time that is shorter than the first time, in a second mode in which a second image based on the second image signal is displayed on the screen.

DESCRIPTION OF EXEMPLARY EMBODIMENTS

Figure 1:
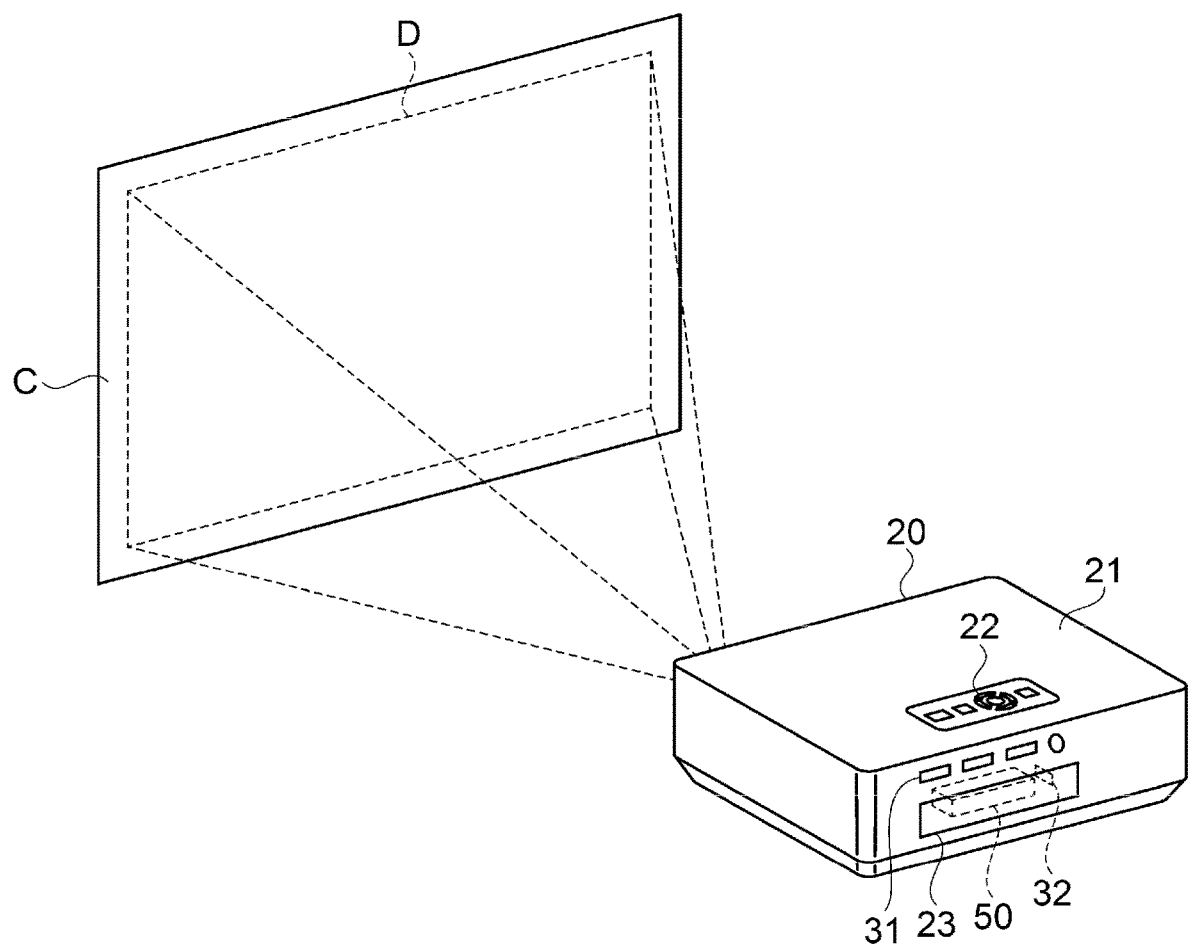
FIG. 1 is a perspective view explaining a display device according to an embodiment.

As shown in FIG. 1, a display device 20 according to an embodiment is a projector that projects light representing an image D onto a screen C and thus displays the image D on the screen C. To the display device 20, an image signal representing the image D is inputted from another device outputting an image signal. The display device 20 has a first interface (I/F) 31 to which an image signal is inputted as a first image signal, and a second interface (I/F) 32 to which an image signal is inputted as a second image signal.

Each of the first I/F 31 and the second I/F 32 can have a terminal of at least one type selected from input terminals such as an HDMI (trademark registered) terminal, HDBaseT (trademark registered) terminal, DisplayPort terminal, VGA terminal, RCA terminal, and S terminal. Each of the first I/F 31 and the second I/F 32 can have a communication circuit that establishes a communication link such as a local area network (LAN) with another device outputting an image signal. The communication link between the display device 20 and another device may be wired or wireless.

The second I/F 32 is coupled, for example, to an image supply device 50 having an auto sleep function. To the second I/F 32, an image signal is inputted from the image supply device 50 as the second image signal. As the image supply device 50, for example, a digital media player outputting an image signal acquired using a content distribution service, or a wireless display adaptor outputting an image signal representing the screen of another device, or the like, can be employed.

The display device 20 has a casing 21 and an input device 22. The casing 21 accommodates therein components forming the display device 20. The casing 21 has an accommodation chamber 23 accommodating at least a part of the image supply device 50. In the example shown in FIG. 1, the accommodation chamber 23 in the state of accommodating the entirety of the image supply device 50 is closed by a lid. Alternatively, the accommodation chamber 23 may be formed as a recessed part in which a part of the image supply device 50 is inserted.

The input device 22 accepts an operation by a user and outputs a signal corresponding to the operation by the user. As the input device 22, various input devices such as a push button, touch sensor, keyboard, or pointing device can be employed. The input device 22 can include a remote controller using wireless or wired communication.

Figure 2:
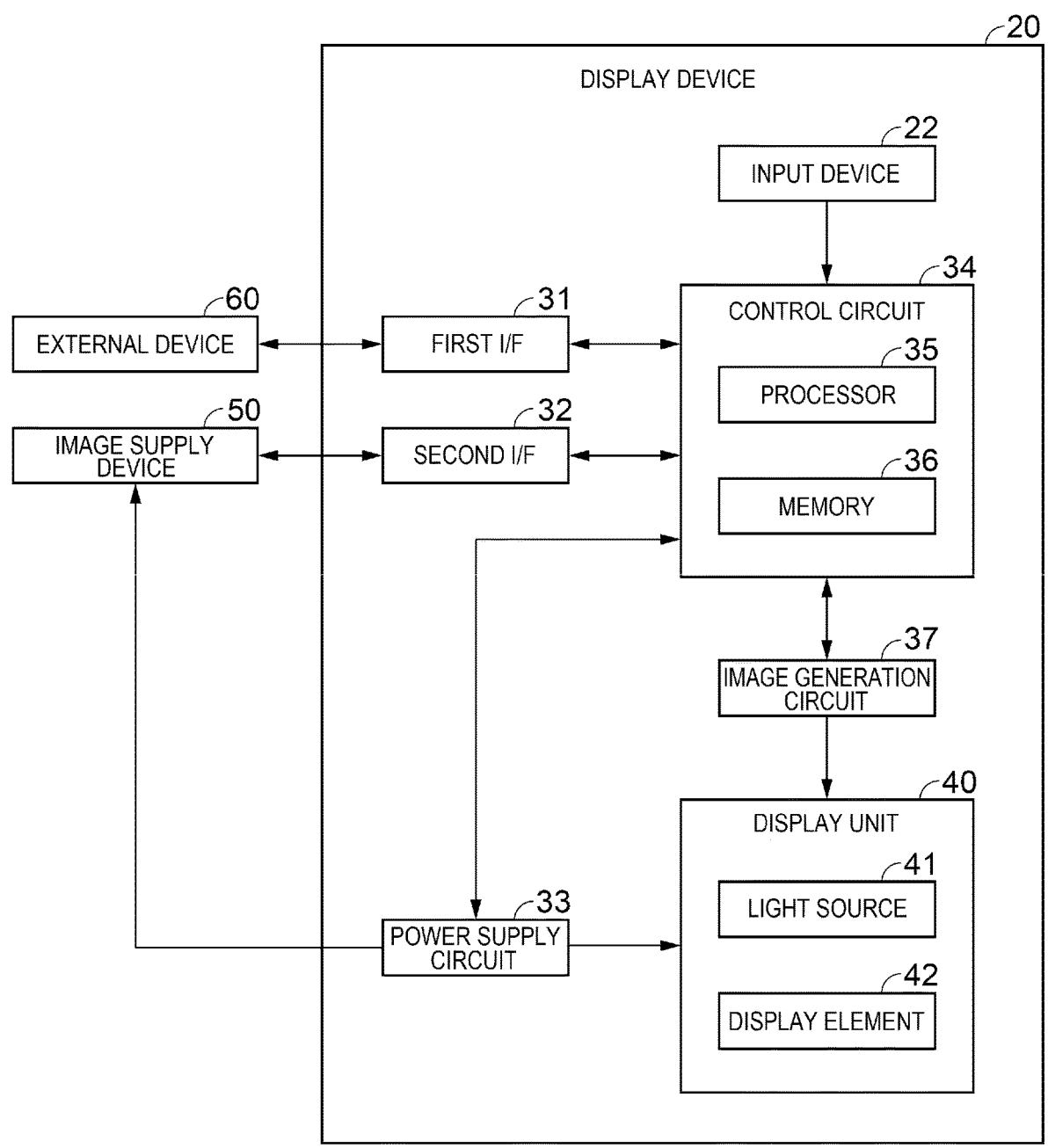
FIG. 2 is a block diagram explaining a basic configuration of the display device according to the embodiment.

As shown in FIG. 2, the display device 20 also has a power supply circuit 33, a control circuit 34, an image generation circuit 37, and a display unit 40, which are built in the casing 21. The power supply circuit 33 has, for example, a power terminal supplied with electric power from a power grid. The power supply circuit 33 converts AC power supplied to the power terminal into DC power and supplies the DC power to each part of the display device 20. In a normal mode, the power supply circuit 33 supplies operating power to the control circuit 34 and the display unit 40. The operating power is necessary electric power for the display device 20 to project the image D. In a sleep mode, the power supply circuit 33 supplies standby power, which is lower than the operating power, to the control circuit 34. The power supply circuit 33 supplies the standby power to the control circuit 34 when electric power is supplied to the power terminal of the power supply circuit 33. In the normal mode, the power supply circuit 33 may supply electric power to the image supply device 50.

The control circuit 34 has a processor 35 and a memory 36. The processor 35 is a processing device of a computer that performs necessary arithmetic processing for the display device 20 to operate. The memory 36 is, for example, a computer-readable storage medium that stores a control program representing a series of necessary processes for the display device 20 to operate, and various data. The processor 35 executes, for example, the control program stored in the memory 36. Thus, the control circuit 34 implements each function described in the embodiment and controls each part of the display device 20.

As the processor 35, a processing device of at least one type from among various logical operation circuits such as a central processing unit (CPU), digital signal processor (DSP), programmable logic device (PLD), and application-specific integrated circuit (ASIC) can be employed. As the memory 36, a semiconductor memory or the like can be employed. The memory 36 is not limited to a non-volatile auxiliary storage device and can include a volatile main storage device such as a register or cache memory built in the CPU. The control circuit 34 may be formed of a single piece of hardware, or two or more separate pieces of hardware.

The image generation circuit 37, under the control of the control circuit 34, generates a drive signal representing the image D based on an image signal inputted from the first I/F 31 or the second I/F 32 and outputs the drive signal to the display unit 40. The image generation circuit may generate a signal representing computer graphics generated by the control program of the control circuit 34. The image generation circuit 37 has a rendering engine, a graphics memory, and the like. The hardware of the image generation circuit 37 may be formed as a part of the hardware of the control circuit 34.

The display unit 40 is, for example, a projection device having a light source 41, a display element 42 such as a liquid crystal light valve having a plurality of pixels, and an optical system, not illustrated, such as a lens and a mirror. The light source 41 may be any one of various discharge lamps or a laser light source. Light emitted from the light source 41 is introduced to the display element 42 by the optical system. The display element 42 modulates the introduced light according to a drive signal inputted from the image generation circuit 37. The display unit 40 projects the light that has travelled through the display element 42 onto the screen C, using the optical system, and thus displays the image D on the screen C. As other systems of the display unit 40, a system that uses a mirror device scanning the screen C with the modulated light and a system that uses a digital micromirror device controlling the reflection of light at each pixel can be employed.

In the example shown in FIG. 2, the first I/F 31 is coupled to an external device 60. To the first I/F 31, an image signal is inputted from the external device 60 as the first image signal. The external device 60 is any device having the function of outputting an image signal to the display device 20, such as a personal computer, smartphone, camera, movie player, television tuner, or game machine.

The control circuit 34 has a first mode in which a first image based on the first image signal is displayed on the screen C and a second mode in which a second image based on the second image signal is displayed on the screen C. In the first mode, the image generation circuit 37, under the control of the control circuit 34, generates a drive signal representing the first image based on the first image signal and outputs the drive signal to the display unit 40, and thus causes the first image to be displayed on the screen C. Similarly, in the second mode, the image generation circuit 37, under the control of the control circuit 34, generates a drive signal representing the second image based on the second image signal and outputs the drive signal to the display unit 40, and thus causes the second image to be displayed on the screen C.

The control circuit 34 has an auto sleep function of shifting to a sleep mode in response to a continuous stop of an image signal for a predetermined time, that is, a continuous absence of input of an effective image signal that continues for a predetermined time. The control circuit 34 in the first mode shifts to the sleep mode in response to a continuous stop of the first image signal for a first time t1. The control circuit 34 shifts to the sleep mode in response to a continuous stop of the second image signal for a second time t2 that is shorter than the first time t1, in the second mode. Specifically, after a decision to shift to the sleep mode is made, the control circuit 34 refreshes the display element 42 and stores the current various settings in the memory 36 and subsequently shifts the power supply circuit 33 to the sleep mode.

The memory 36 stores each of information representing the first time t1 and information representing the second time t2. The first time t1 is, for example, 30 minutes. The second time t2 is, for example, 1 minute. The information representing the first time t1 may be changed in response to an operation by the user. That is, the input device 22 changes the information representing the first time t1 stored in the memory 36 in response to an operation by the user. The first time t1 can be changed, for example, within a range from several minutes to several tens of minutes. Thus, the first time t1 in the first mode can be decided in response to a request from the user. The information representing the second time t2 is a fixed value. The second time t2 may be, for example, 0 minutes. In this case, the control circuit 34 shifts to the sleep mode at a point in time when a stop of the second image signal is detected.

In the sleep mode, the power supply circuit 33 does not supply the operating power to the display unit 40. Therefore, the image D is not displayed on the screen C. The control circuit 34, in the sleep mode, shifts to a normal mode on detecting a signal corresponding to a predetermined operation on the input device 22. In the normal mode, the power supply circuit 33 supplies the operating power to the display unit 40. Therefore, the image D is displayed on the screen C. That is, the power consumption by the display device 20 in the sleep mode is lower than in the normal mode.

Figure 3:
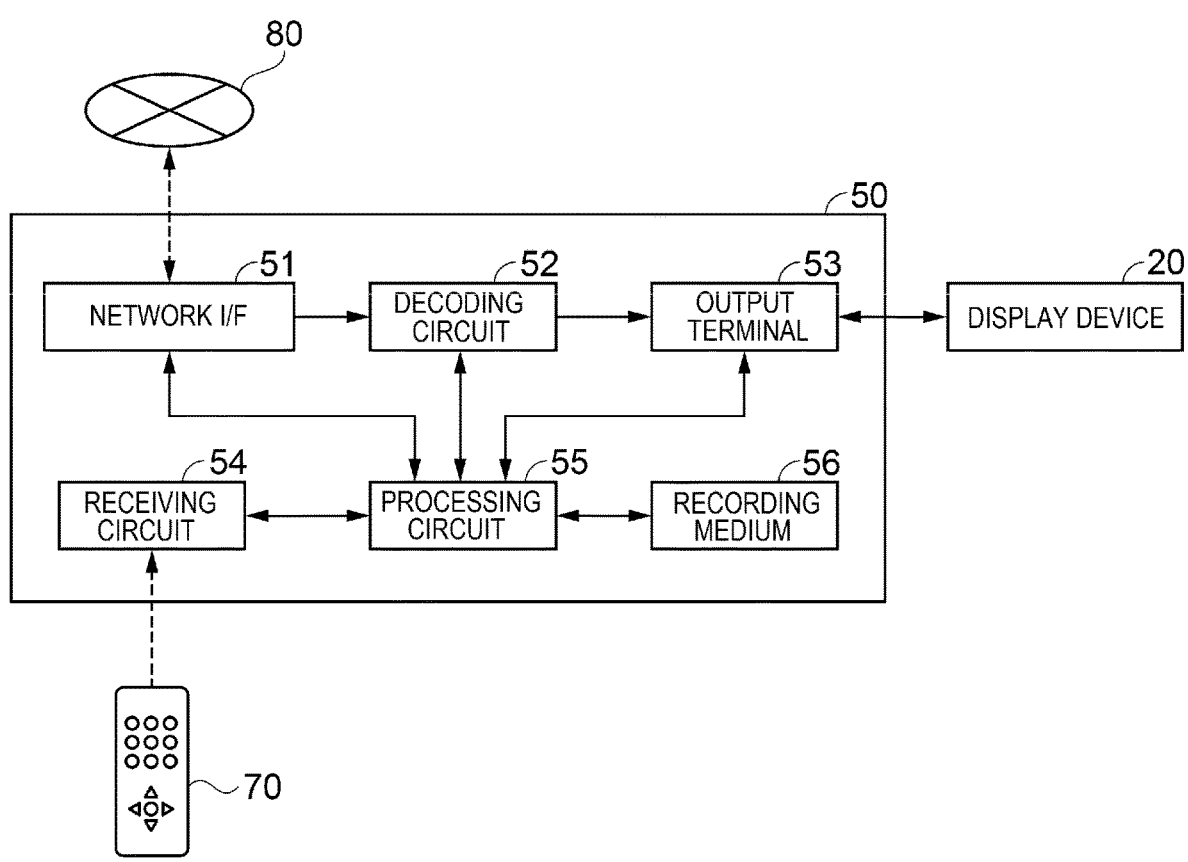
FIG. 3 is a block diagram explaining an example of an image supply device.

As shown in FIG. 3, the image supply device 50 has, for example, a network I/F 51, a decoding circuit 52, an output terminal 53, a receiving circuit 54, a processing circuit 55, and a recording medium 56. The network I/F 51 connects to a network 80 such as the internet via a communication link. The communication link may be wired or wireless. The network I/F 51, for example, under the control of the processing circuit 55, receives streaming information representing a digital content from a server providing a content distribution service on the network 80 and outputs the streaming information to the decoding circuit 52.

The decoding circuit 52 decodes the streaming information inputted from the network I/F 51, converts the streaming information into an image signal in a format to be inputted to the second I/F 32, and outputs the image signal to the output terminal 53. That is, when the second I/F 32 conforms, for example, to the HDMI standard, the decoding circuit 52 generates an image signal conforming to the HDMI standard from the streaming information and outputs the image signal to the output terminal 53. The decoding circuit 52 and the processing circuit 55 can be formed of the same hardware.

The output terminal 53 is a terminal coupled to the input terminal of the second I/F 32. The output terminal 53 outputs the image signal decoded by the decoding circuit 52 to the second I/F 32 as the second image signal. When the second I/F 32 conforms to the HDMI standard, the output terminal 53 may relay a control signal based on a CEC (consumer electronics control) function, between the display device 20 and the processing circuit 55.

The receiving circuit 54 receives a control signal transmitted in response to an operation by the user, from a remote controller 70 accepting the operation by the user. The receiving circuit 54 has, for example, an antenna and a signal processing circuit processing a signal received via the antenna. The receiving circuit 54 receives, for example, a control signal transmitted according to a wireless communication standard such as Bluetooth (trademark registered). The receiving circuit 54 decodes the control signal transmitted from the remote controller 70 and outputs the control signal to the processing circuit 55. When the control signal is relayed between the display device 20 and the image supply device 50, a remote controller functioning as the input device 22 of the display device 20 may also function as the remote controller 70 of the image supply device 50.

The processing circuit 55 forms a processing device of a computer that executes necessary processing for the image supply device 50 to operate. The processing circuit 55 includes, for example, a processing device such as a CPU. The recording medium 56 stores a program representing a series of necessary processes for the image supply device 50 to operate, and various data. The recording medium 56 includes, for example, a semiconductor memory. The processing circuit 55 executes, for example, the program stored in the recording medium 56 and thus implements each function described in the embodiment and controls each part of the image supply device 50. The image supply device 50, under the control of the processing circuit 55, outputs an image signal representing a digital content to the second I/F 32 as the second image signal. The image supply device 50 may output an image signal representing computer graphics generated by the program of the processing circuit 55 to the second I/F 32 as the second image signal.

The auto sleep function of the image supply device 50 is the function of shifting to the sleep mode in response to a continuous absence of an operation by the user that continues for a waiting time t0 in a predetermined waiting state. The waiting state is, for example, a state where an image representing a digital content is not displayed by the display device 20 and instead a waiting screen to wait for an operation by the user, such as a home screen, menu screen or screen saver, is displayed by the display device 20. The waiting time t0 is, for example, 30 minutes. The waiting time t0 may be arbitrarily decided by the user, for example, within a range from several minutes to several hours. The image supply device 50 may have the function of shifting to the sleep mode at a point in time when playback of a content is ended. In the sleep mode, the image supply device 50 stops outputting an image signal from the output terminal 53.

Figure 4:
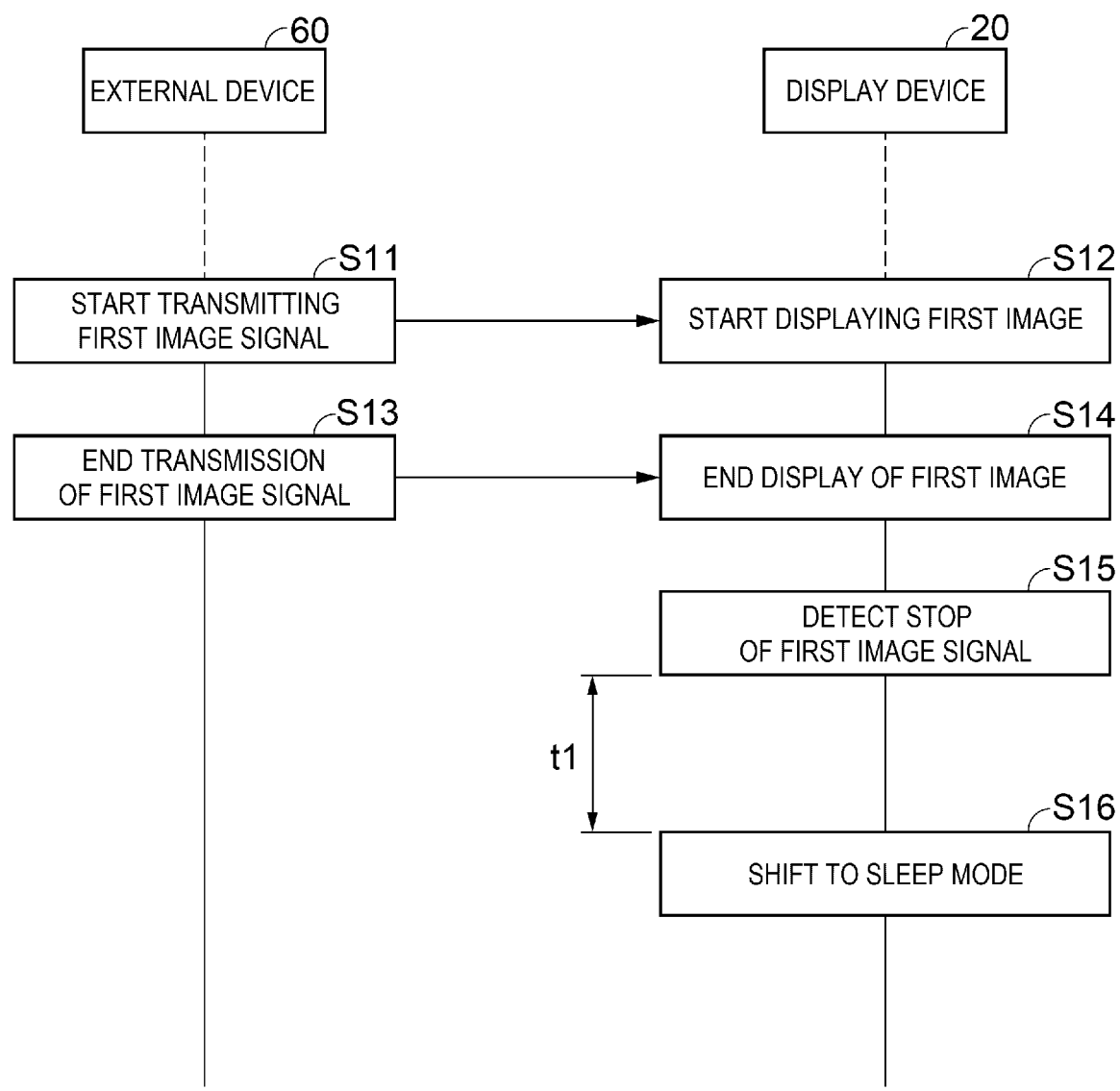
FIG. 4 is a sequence chart explaining operations of the display device in a first mode.

As a method for controlling the display device 20 according to the embodiment, an example of operations of the external device 60 and the display device 20 will now be described with reference to the flowchart of FIG. 4. The control circuit 34 is shifted into the first mode in advance, in response to an operation by the user on the input device 22.

In step S11, the external device 60 starts transmitting the first image signal. That is, the external device 60 inputs an image signal as the first image signal to the first I/F 31. In step S12, the display device 20 starts displaying the first image based on the first image signal. That is, the control circuit 34 controls the image generation circuit 37 to generate a drive signal representing the first image from the first image signal inputted to the first I/F 31. Thus, the display unit 40 displays the first image on the screen C.

In step S13, the external device 60 ends the transmission of the first image signal, for example, in response to an operation by the user on the external device 60. That is, the external device 60 stops the first image signal inputted to the first I/F 31. In response to this, the display device 20 in step S14 ends the display of the first image.

In step S15, the control circuit 34 detects the stop of the first image signal. In step S16, the control circuit 34 shifts to the sleep mode in response to a continuous stop of the first image signal for the first time t1. When an operation on the input device 22 is carried out before the first time t1 passes from the detection of the stop of the first image signal, the control circuit 34 does not shift to the sleep mode and instead resets the measurement of the first time t1. That is, when the first image signal is stopped in the first mode and the first time t1 passes in the state of no operation on the input device 22, the control circuit 34 shifts to the sleep mode.

Figure 5:
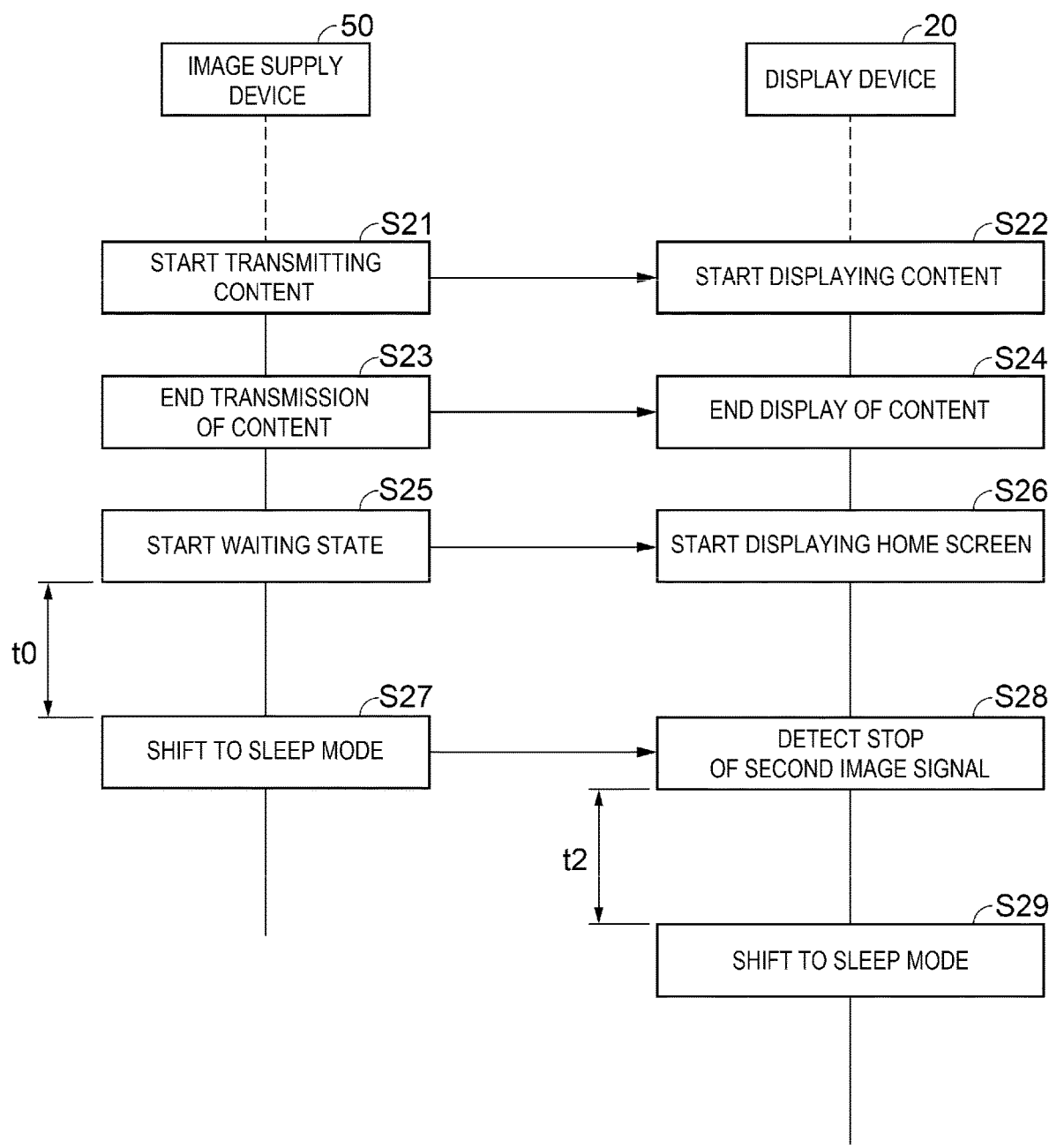
FIG. 5 is a sequence chart explaining operations of the display device in a second mode.

As a control method for controlling the display device 20 according to the embodiment, an example of operations of the image supply device 50 and the display device 20 will now be described with reference to the flowchart of FIG. 5. The control circuit 34 is shifted into the second mode in advance, in response to an operation by the user on the input device 22.

In step S21, the image supply device 50 starts transmitting the second image signal representing, for example, a digital content. That is, the image supply device 50 inputs an image signal representing a digital content to the second I/F 32 as the second image signal. In step S22, the display device 20 starts displaying the second image based on the second image signal. That is, the control circuit 34 controls the image generation circuit 37 to generate a drive signal representing the second image from the second image signal inputted to the second I/F 32. Thus, the display unit 40 displays the second image representing the digital content on the screen C.

In step S23, the image supply device 50 ends the transmission of the second image signal, for example, in response to the end of the digital content or an operation on the remote controller 70 by the user. That is, the processing circuit 55 stops the second image signal inputted to the second I/F 32 from the output terminal 53. In response to this, the display device 20 in step S24 ends the display of the second image representing the digital content.

In step S25, the image supply device 50 starts the waiting state where a waiting screen is displayed. In this example, the waiting screen is assumed to be a home screen. The image supply device 50 inputs an image signal representing the home screen to the second I/F 32 as the second image signal. In step S26, the display device 20 starts displaying the home screen as the second image based on the second image signal.

In step S27, the image supply device 50 shifts to the sleep mode in response to a lapse of the predetermined waiting time t0 from the start of the waiting state in step S25. Specifically, the image supply device 50 shifts to the sleep mode in response to a continuous absence of an operation by the user that continues for the waiting time t0 in the waiting state. Thus, the image supply device 50 stops outputting the second image signal.

In step S28, the display device 20 detects the stop of the second image signal. In step S29, the control circuit 34 shifts to the sleep mode in response to a continuous stop of the second image signal for the second time t2. However, when an operation on the input device 22 is carried out before the second time t2 passes from the detection of the stop of the second image signal, the control circuit 34 does not shift to the sleep mode and instead resets the measurement of the second time t2. That is, when the second image signal is stopped in the second mode and the second time t2 passes in the state of no operation on the input device 22, the control circuit 34 shifts to the sleep mode.

As described above, the display device 20 in the second mode shifts to the sleep mode in response to a continuous stop for the second time t2 that is shorter than the first time t1, of the second image signal inputted to the second I/F 32 from the image supply device 50. Therefore, compared with when an image signal from the image supply device 50 is inputted to the first I/F 31 to display an image in the first mode, an increase in power consumption can be restrained by selectively reducing the time taken until the display device 20 in the second mode automatically shifts to the sleep mode.

That is, if an image from the image supply device 50 is displayed in the first mode, a time that is the sum of the waiting time t0 and the first time t1 is needed until both the image supply device 50 and the display unit 40 automatically shift to the sleep mode. Meanwhile, the second time t2 set for the second mode is shorter than the first time t1. Therefore, the time taken until both the image supply device 50 and the display unit 40 automatically shift to the sleep mode can be reduced.

When the power supply circuit 33 supplies electric power to the image supply device 50 in the second mode, the power supply circuit 33 stops supplying electric power to the image supply device 50 in the sleep mode. Thus, the effect of restraining an increase in the power consumption by the display device 20 becomes prominent.

Although the embodiment has been described above, the present disclosure is not limited to the description of the embodiment. The configuration of each part may be replaced by any configuration having a similar function. Also, any configuration in each embodiment may be omitted or added within the technical scope of the present disclosure. Based on such descriptions, various alternative embodiments become obvious to a person skilled in the art.

For example, the display unit 40 may be a flat panel display such as a liquid crystal display or organic electroluminescence display. In this case, the display unit 40 may be formed as a touch panel display unified with the input device 22. The first time t1, which is described as changeable, may be changed to a time equal to the second time t2, for example, 1 minute or the like. That is, the first time t1 may be changed to a time longer than the second time t2. When the first time t1 is equal to the second time t2, the first time t1 is the minimum value available to the second time t2 and therefore it will be easily understood that an increase in power consumption until the sleep mode in the second mode is restrained. Also, the image supply device 50 may transmit a sleep notification indicating execution of sleep to the display device 20 immediately before the auto sleep function executes sleep. The control circuit 34 may shift to the sleep mode, setting the second time t2 to 0 in response to the sleep notification.

The present disclosure also includes various embodiments that are not described above, such as applying the foregoing individual configurations to each other. The technical scope of the present disclosure is defined only by the specifying matters according to the reasonable claims derived from the foregoing description.

What is claimed is:

1. A method for controlling a display device having a first interface to which a first image signal is inputted from an external device and a second interface to which a second image signal is inputted from an image supply device external to the display device having an auto sleep function, the method comprising:

shifting to a sleep mode in response to a continuous stop of the first image signal for a first time, in a first mode in which a first image based on the first image signal is displayed on a screen; and shifting to the sleep mode in response to a continuous stop of the second image signal for a second time that is shorter than the first time, in a second mode in which a second image based on the second image signal is displayed on the screen.

2. The method for controlling the display device according to claim 1, wherein the second time is a fixed value.

3. The method for controlling the display device according to claim 1, wherein information representing the first time is changed in response to an operation by a user via an input device.

4. The method for controlling the display device according to claim 1, wherein in the second mode, electric power is supplied to the image supply device.

5. A display device comprising:

a first interface to which a first image signal is inputted from an external device;

a second interface to which a second image signal is inputted from an image supply device external to the display device having an auto sleep function;

a display unit displaying an image on a screen; and a control circuit shifting to a sleep mode in response to a continuous stop of the first image signal for a first time, in a first mode in which a first image based on the first image signal is displayed on the screen, and shifting to the sleep mode in response to a continuous stop of the second image signal for a second time that is shorter than the first time, in a second mode in which a second image based on the second image signal is displayed on the screen.

6. The display device according to claim 5, further comprising a memory storing information representing the second time as a fixed value.

7. The display device according to claim 5, further comprising an input device changing information representing the first time in response to an operation by a user.

8. The display device according to claim 6, further comprising a power supply circuit supplying electric power to the image supply device in the second mode.

\* \* \* \* \*